US012262227B2

(12) United States Patent
Raizer et al.

(10) Patent No.: US 12,262,227 B2
(45) Date of Patent: Mar. 25, 2025

(54) DYNAMIC COLLABORATION AMONG COGNITIVE AGENTS MANAGING RADIO ACCESS NETWORKS

(71) Applicant: Telefonaktiebolaget LM Ericsson (publ), Stockholm (SE)

(72) Inventors: Klaus Raizer, Indaiatuba (BR); Yifei Jin, Solna (SE); André Luis Ogando Paraense, Campinas SP (BR); Ricardo Ribeiro Gudwin, Campinas SP (BR); Aneta Vulgarakis Feljan, Stockholm (SE); Rafia Inam, Västerås (SE); Amadeu Do Nascimento Junior, Indaiatuba (BR); Alberto Hata, Campinas SP (BR); Andrii Berezovskyi, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 482 days.

(21) Appl. No.: 17/619,363

(22) PCT Filed: Jun. 28, 2019

(86) PCT No.: PCT/EP2019/067483
§ 371 (c)(1),
(2) Date: Dec. 15, 2021

(87) PCT Pub. No.: WO2020/259857
PCT Pub. Date: Dec. 30, 2020

(65) Prior Publication Data
US 2022/0264329 A1    Aug. 18, 2022

(51) Int. Cl.
*H04W 24/02*    (2009.01)
*H04L 41/16*    (2022.01)
*H04W 24/08*    (2009.01)

(52) U.S. Cl.
CPC ............. *H04W 24/02* (2013.01); *H04L 41/16* (2013.01); *H04W 24/08* (2013.01)

(58) Field of Classification Search
None
See application file for complete search history.

(56) References Cited

U.S. PATENT DOCUMENTS

2013/0281089 A1    10/2013    Chandrasekhar et al.
2015/0056995 A1    2/2015    Baillargeon
(Continued)

FOREIGN PATENT DOCUMENTS

| EP | 2219402 A2 | 8/2010 |
| EP | 2782381 A1 | 9/2014 |
| WO | 2015171054 A1 | 11/2015 |

OTHER PUBLICATIONS

International Search Report and Written Opinion of the International Searching Authority for PCT International Application No. PCT/EP2019/067483 dated Oct. 16, 2019.
(Continued)

*Primary Examiner* — Diane L Lo
(74) *Attorney, Agent, or Firm* — Sage Patent Group

(57) ABSTRACT

A Cognitive Manager (CM) controls a RAN. The CM obtains from the RAN a set of local needs identifying a radio communication performance criterion that is to be satisfied. A set of neighbor needs are obtained from a neighbor CM. An event message is received from the RAN containing a radio metric that does not presently satisfy at least one of the set of local needs. A set of present neighbor improvement action drives being performed or will be performed to satisfy the set of neighbor needs, are obtained from the neighbor CM. A combination of the set of local needs, the set of the neighbor needs, the set of present neighbor improvement action drives, and the radio metric, is used to determine a local improvement action drive that is to be performed by (Continued)

the RAN. An adjustment report identifying the local improvement action drive is provided to the RAN.

18 Claims, 7 Drawing Sheets

(56) References Cited

U.S. PATENT DOCUMENTS

| | | | |
|---|---|---|---|
| 2015/0281980 A1 | 10/2015 | Zhou et al. | |
| 2018/0083680 A1* | 3/2018 | Guo | H04B 7/088 |
| 2019/0132806 A1* | 5/2019 | Kumar | H04W 52/367 |
| 2019/0357061 A1* | 11/2019 | Vivanco | H04W 76/19 |

OTHER PUBLICATIONS

Thomas et al., "Cognitive Networks: Adaptation and Learning to Achieve End-to-End Performance Objectives," Topics in Radio Communications, IEEE Communications Magazine, Dec. 2006, pp. 51-57.

3GPP TS 36.423 V11.2.0, "3rd Generation Partnership Project; Technical Specification Group Radio Access Network; Evolved Universal Terrestrial Radio Access Network (E-UTRAN); X2 application protocol (X2AP) (Release 11)," Sep. 2012, 136 pages.

* cited by examiner

DYNAMIC COLLABORATION AMONG COGNITIVE AGENTS MANAGING RADIO ACCESS NETWORKS

CROSS REFERENCE TO RELATED APPLICATION

This application is a 35 U.S.C. § 371 national stage application of PCT International Application No. PCT/EP2019/067483 filed on Jun. 28, 2019, the disclosure and content of which is incorporated by reference herein in its entirety.

TECHNICAL FIELD

The present disclosure relates to radio communication systems and more particularly to dynamic management of radio access networks.

BACKGROUND

In mobile networks, a cluster of base stations (BTS) are interconnected by hardware infrastructure to provide wireless communication access for user equipment (UE). In the physical layer (PHY), the BTS should provide adequate signal to noise and interference ratio (SINR) to maintain coverage in all directions across a service cell using adopted carrier frequency bands. In a dynamic radio environment, overshoot coverage and coverage holes (sometimes also known as gray spots, but hereafter referred to as blind spots) happen due to changes in geographical obstructions (for example, setting up a new building, a tunnel or bridge), interference from new BTS deployment, etc. These changes can harm the quality of service (QoS) provided to UE users at blind spots or cell edges. In network management, this is treated as a coverage and capacity optimization (CCO) problem and applies to most intra-Radio Access Technology (RAT) and inter-RAT use cases.

In the context of LTE, an Evolved Node B (eNB) is responsible for servicing all UEs within its geographical coverage. Power allocation and control should be performed in an optimized manner to minimize blind spots areas. Specifically, power control regulates how much power the eNB transmits at during communications. Power allocation regulates how an eNB transmitter spreads the power over the adopted frequency spectrum. Both approaches can operate to decrease interference from neighboring cells. Radio link failure (RLF) reported by a UE or detected by an eNB may be identified as a blind spot. An eNB responsive action to RLF may be link adaptation and/or Transmission Time Interval (TTI) bundling to attempt to maintain connectivity but with undesirable reduction in spectral efficiency and waste of network resources. UE handover between eNBs is another responsive action used to improve signal strength. Handover can be performed when a UE is moving across the coverage areas of several cells, and the best eNB is dynamically selected to serve the UE along its travel route. For handover, eNBs communicate through an X2 interface on an adapted frequency.

In current solutions, each eNB performs coverage and capacity optimization based on its own interests and without sharing information beyond frequency usage with neighboring eNBs. For example, when an eNB is capable of performing actions such as dynamic power control, power allocation, or handover, the eNB makes decisions based on its own interest of optimizing the coverage in its own cell, without using any informational knowledge of its neighbouring eNBs. Currently eNBs only share frequency information between each other (for avoiding interference) using the protocol from X2 interface. They don't share any other information.

Once a UE is in a blind spot, the serving eNB may not be aware of which of its directional antennas it should boost transmission power to maintain communications with the UE. Furthermore, increasing power in specific directions for selected frequency bands could interfere with services of a neighboring cell. For an edge user, located along an cell edge with poor coverage, there is no current mechanism in 3GPP released standards to allow adequate management consideration of the trade-offs between increasing the serving antenna gain, performing handover, boosting a neighboring BTS or deploying a new BTS in the affected area. Sub-optimal management decisions can result in waste of network hardware and radio resources, reduced QoS, and increased operational and maintenance costs.

SUMMARY

Various embodiments disclosed herein are directed to providing improved communication services by radio access networks (RANs), such as eNBs and gNBs, communicating with mobile terminals, such as UEs, through exchange of certain information between cognitive managers (CMs) for use in controlling operation of the RANs.

One embodiment is directed to a method by a CM for controlling a RAN among a plurality of RANs of a radio communications system. The method includes obtaining a set of local needs from the RAN, where each of the local needs identifies a radio communication performance criterion that is to be satisfied for the RAN. The method obtains from at least one neighbor CM a set of the neighbor needs for the at least one neighbor RAN. An event message is received from the RAN which contains a radio communication performance metric that does not presently satisfy at least one of the set of local needs from the RAN. The method obtains from the at least one neighbor CM a set of present neighbor improvement action drives that are being performed or will be performed to satisfy the set of the neighbor needs for the at least one neighbor RAN. The method combines the set of local needs from the RAN, the set of the neighbor needs obtained for the at least one neighbor CM, the set of present neighbor improvement action drives from the at least one neighbor CM, and the radio communication performance metric received in the event message from the RAN. The method then determines, based on the combining, a local improvement action drive that is to be performed by the RAN to satisfy the at least one of the set of local needs from the RAN, and provides an adjustment report to the RAN. The adjustment report identifies the local improvement action drive that is to be performed.

Another related embodiment is directed to a network node for controlling a RAN among a plurality of RANs of a radio communications system. The network node includes a CM that operates to control the RAN. The operations include obtaining a set of local needs from the RAN, where each of the local needs identifies a radio communication performance criterion that is to be satisfied for the RAN. The operations obtain from at least one neighbor CM a set of the neighbor needs for the at least one neighbor RAN. An event message is received from the RAN that contains a radio communication performance metric that does not presently satisfy at least one of the set of local needs from the RAN. A set of present neighbor improvement action drives that are being performed or will be performed to satisfy the set of the neighbor needs for the at least one neighbor RAN, are obtained from the at least one neighbor CM. The operations combine the set of local needs from the RAN, the set of the neighbor needs obtained for the at least one neighbor CM, the set of present neighbor improvement action drives from the at least one neighbor CM, and the radio communication performance metric received in the event message from the RAN. Based on the combining, a local improvement action drive is determined that is to be performed by the RAN to satisfy the at least one of the set of local needs from the RAN. An adjustment report is provided to the RAN, where the adjustment reporting identifies the local improvement action drive that is to be performed.

Another related embodiment is directed to a CM computer program product for controlling a RAN among a plurality of RANs of a radio communications system.

Some potential advantages of these embodiments include that the CMs can exchange information that enables their management of the RANs to be performed with more optimally consideration of the trade-offs between, for example, increasing the serving antenna gain, performing handover, boosting a neighboring RAN or deploying a new RAN in the affected area. Such more-optimized management decisions can avoid waste of network hardware and radio resources, increase QoS, and/or decrease operational and maintenance costs.

Other methods, network nodes, and computer program products for controlling RANs according to embodiments of the inventive subject matter will be or become apparent to one with skill in the art upon review of the following drawings and detailed description. It is intended that all such additional methods, network nodes, and computer program products be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Figure 1:
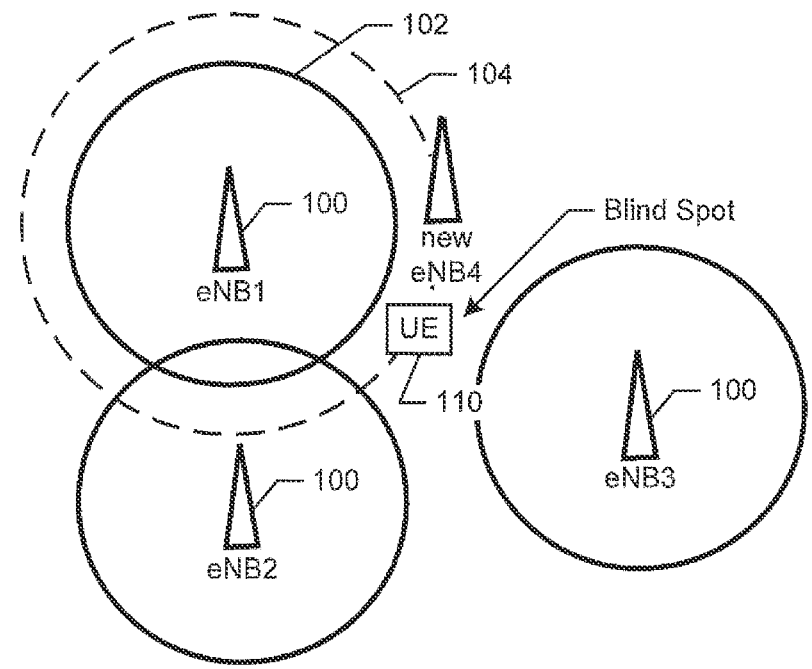
FIG. 1 illustrates a radio communication system including a plurality of eNBs or other RANs which may be managed by cognitive managers operating in accordance with some embodiments of the present disclosure.
Figure 2:
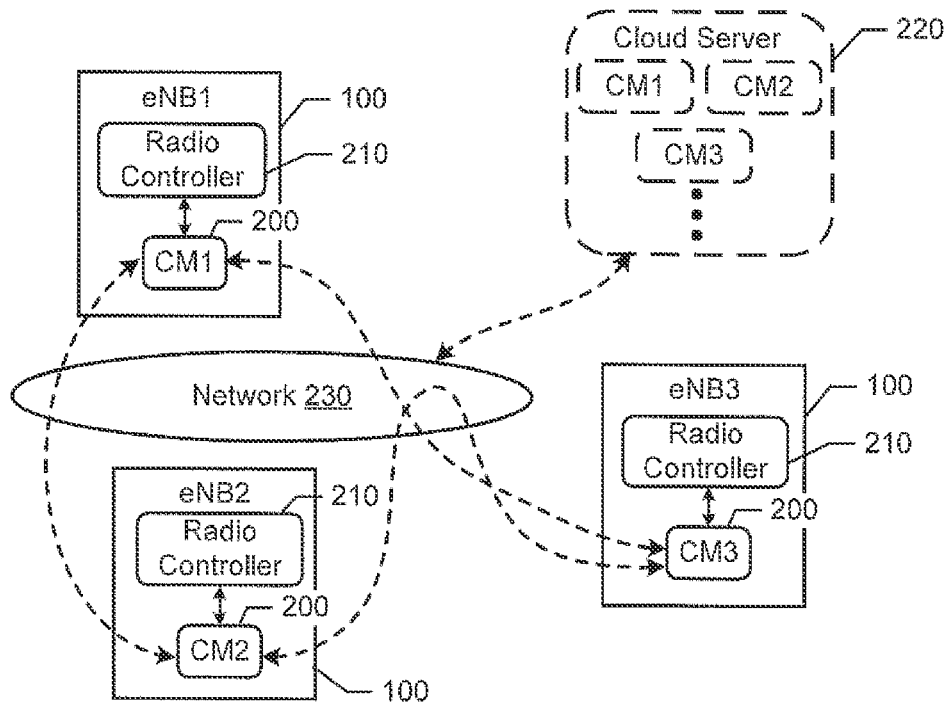
FIG. 2 is a block diagram illustrating types of information that is shared between CMs to cooperatively manage the eNBs of FIG. 1 in accordance with some embodiments of the present disclosure.

FIG. 1 illustrates a radio communication system with a plurality of eNBs 100 or other RANs which are managed by cognitive managers (CM). FIG. 2 is a block diagram illustrating types of information that is shared between CMs to cooperatively manage the eNBs of FIG. 1 in accordance with some embodiments of the present disclosure. Referring to FIGS. 1 and 2, a UE 110 is located in a blind spot outside the cellular coverage areas of the eNB1, eNB2, and eNB3 which are collectively referred to as eNBs 100. As will be explained in further detail below, each of the eNBs 100 is controlled by a respective CM, where each CM can control a different one of the eNBs 100. In the context of FIG. 2, eNB1 100 has a radio controller 210 whose operation is controlled by CM1 200, another eNB2 100 has a radio controller 210 whose operation is controlled by CM2 200, and another eNB3 100 has a radio controller 210 whose operation is controlled by CM3 200. The CMs 200 may reside within the respective eNBs, e.g., cohosted on processors that perform the radio controller 210 functionality (i.e., communication protocol operations, etc.), and/or may reside within a cloud server 220 that is communicatively connected through a network 230 for communicating with and controlling the eNBs 100, i.e., controlling the radio controllers 210.

In accordance with at least some embodiments, the term "cognitive" in CMs refers to machine processes for observing characteristics of eNBs, making behavior choices for controlling the eNBs, and receiving feedback related to the eNBs, all the while performing machine learning configured to help optimize how future behaviors are controlled based on past and current feedback. A community of distributed CMs that share knowledge between themselves can optimize the eNBs' behavior and system topology responsive to changing environmental conditions, network topology (e.g., new eNB deployment), served numbers and locations of eNBs, QoS demands of served eNBs, etc.

In multi-agent scenarios (e.g. IoT, communication networks, cognitive radio, robotics) establishing collaboration among eNBs or other RANs without use of CMs disclosed herein may not be possible because there isn't a defined way for eNBs to share and communicate their local needs. Local needs are performance indexes that should be optimized, i.e. a local need is an "urge" experienced by the eNB to increase or decrease a particular key performance indicator (KPI). In this sense, local needs can differ from goals and constraints because a goal is a target state to be achieved and constraints are states that ought to be avoided.

In the context of the present example embodiments, each eNB can have a set of local needs. Each of the local needs identifies a radio communication performance criterion, such as a KPI, that is to be satisfied for the RAN. For example, a local need can correspond to a performance criterion that is required to be kept within a saturated (equilibrium) region limited by a lower bound and an upper bound. When a local need value of an eNB decreases below the lower bound to the under-saturated region, the CM associated with the eNB responsively generates a local improvement action drive (also referred to herein as "drive" for brevity) to control operation of the eNB in a way that returns the local need value back to the saturated region. Similarly, when a local need value exceeds the upper bound to the over-saturated region, the CM generates another local improvement action drive to decrease this local need value. The CM may simultaneously generate or operate a plurality of drives each configured to return a different type of local need value back to a defined region.

FIG. 2 depicts a possible implementation of where each CM 200 is assigned to control a different one of the eNBs 100. The eNBs 100 and their assigned CMs 200 talk to each other (CM-eNB communication) with the CMs 200 each receiving information from its assigned eNB 100 and to responsively configure and control operations of the assigned eNB 100. The CMs 200 also can communicate with each other to exchange information regarding their assigned eNBs 100 in order to select or otherwise generate the most optimal local improvement action drive to satiate a local need of an eNB 100 while taking into consideration the local needs of its neighbor eNBs 100.

The information that is shared between the CMs 200 and the responsive operations performed by the CMs 200 can be adapted to have one or more operational technical effects of decreasing or eliminating blind spot areas, reducing excessive eNB link adaptation and retransmission waste, reducing eNB and UE energy consumption, and/or better optimizing decisions on future eNB (radio base station (RBS)) deployments (e.g. providing insight for better locations and configurations for future sites). The CMs 200 may provide the one or more operational technical effects without requiring special hardware or changes in existing LTE equipment. Operators deploying one or more embodiments herein can benefit in terms of power reduction and improved area coverage, and accordingly users can obtain higher satisfaction because of the improved coverage area.

As explained above, these embodiments can also be beneficial for 5G networks, especially for those cases where QoS requirements are strict. Although various embodiments are disclosed herein in the context of an LTE system having CMs that manage eNBs, these embodiments are not limited thereto and can be used with any type of radio communication system, including 5G New Radio (NR) systems. Thus, the term "eNB" may interchangeably be replaced with the term "gNB". Moreover, the term RAN used herein may be any type of radio access network node including, without limitation, eNB, gNB, etc.

For example, in the context of the example of FIG. 1, CM1 may obtain a set of local needs from eNB1, obtain a set of the neighbor needs from CM2 for eNB2 and obtain a set of the neighbor needs from CM3 for eNB3. CM1 can receive from eNB1 a radio link failure (RLF) event message reported by UE 1110, and obtain from CM2 and CM3 a set of present neighbor improvement action drives that are being performed or will be performed to satisfy the set of the neighbor needs for eNB2 and eNB3, respectively, CM1 can combine this information and determine therefrom a local improvement action drive that is to be performed by eNB1 to satisfy one of the local needs, e.g., remedying the RLF reported by UE 110. CM1 can therefrom provide an adjustment report to eNB1, where the adjustment report identifies the local improvement action drive that is to be performed. As shown in FIG. 1, the local improvement action drive that is determined by eNB1 is to boost its transmission power so that UE 110 is within the coverage area of eNB1 and no longer residing in a coverage blind spot. Various types of information that can be exchanged between an eNB (or other RAN) and a CM, and that can be exchanged between CMs, is explained in further detail below.

Example local improvement action drives that can be determined by the CM and used to control eNB1 can include any one or more of the following: determining a link adaptation parameter to be used by the RAN to communicate with a mobile device to satisfy the at least one of the set of local needs from the RAN; determining a transmission timing interval parameter to be used by the RAN to communicate with the mobile device to satisfy the at least one of the set of local needs from the RAN; determining a dynamic power control parameter and/or a power control parameter to be used by the RAN to communicate with the mobile device to satisfy the at least one of the set of local needs from the RAN; and determining a handover parameter to be used for controlling handover of the mobile device between the RAN and one of the at least one neighbor RAN to satisfy the at least one of the set of local needs from the RAN.

Figure 3:
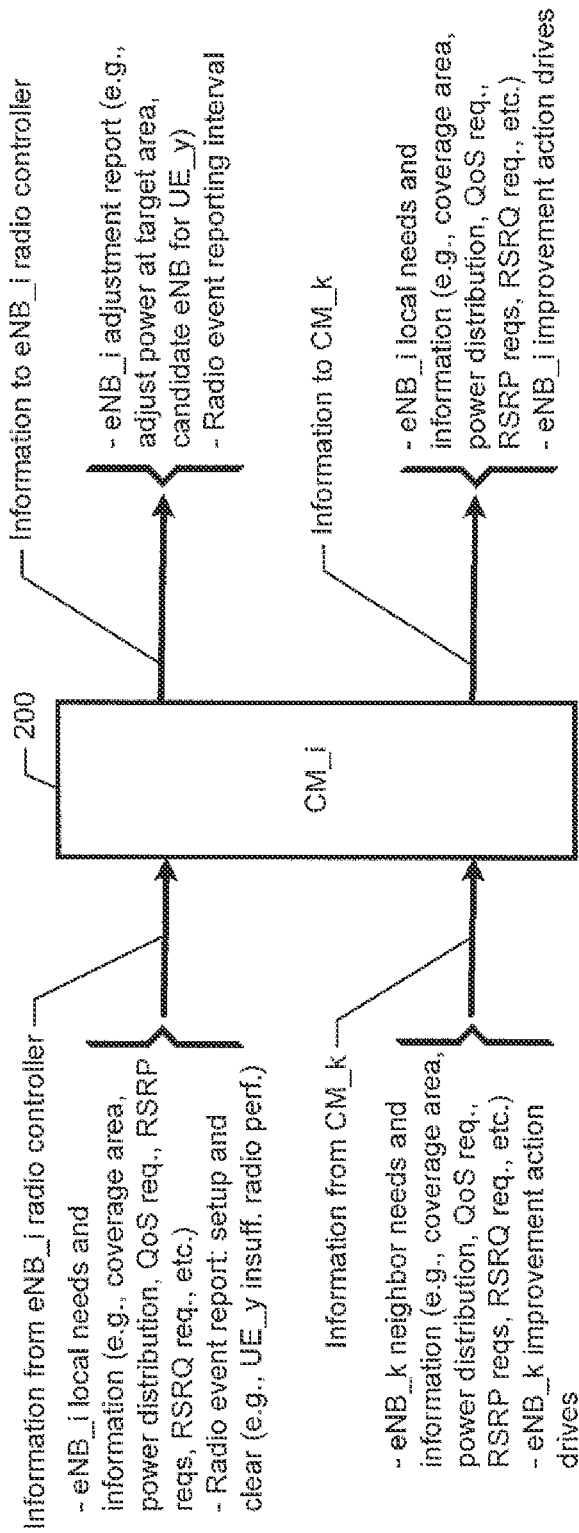
FIG. 3 illustrates various types of information that are input to and output by a CM in accordance with some embodiments of the present disclosure.

FIG. 3 illustrates various types of information that are input to and output by a CM 200, e.g., CM_i, in accordance with some embodiments of the present disclosure. Referring to FIG. 2, example eNB_i local need information that CM_i can receive from the radio controller of eNB_i can include, without limitation, any one or more of information characterizing its coverage area and/or power distribution in the coverage area, QoS requirement(s) (e.g., acceptable range(s)), reference signal received power (RSRP) and/or reference signal received quality (RSRQ) requirement(s) (e.g., acceptable range(s)), etc. CM_i can also receive event messages containing a radio communication performance metric that does not presently satisfy at least one of the set of local needs from eNB_i. The event messages may report radio events such as RLF, other reports indicting on a separable QoS or insufficient radio performance, setup or clearing of radio event status, etc.

CM_i can provide to the radio controller of eNB_i an eNB_i adjustment report that identifies one or more improvement action drives which are configured to cause eNB_i to adjust how it performs any one or more of: link adaptation (i.e., regulate modulation used for communications); TTI bundling (e.g., for use in retransmitting the same packet multiple times); dynamic power control and/or allocation; and/or handover of a UE from eNB_i to another eNB or from another eNB to eNB_i. Thus, for example, CM_i may initiate handover responsive to the combination of information obtained from eNB_i and from CMs of neighboring eNBs, where the handover decision can include identifying a best one of the neighboring eNBs to which a UE shall be handed over and assisting with the handover process through communications with the neighboring eNB and the UE.

A UE may assume that a radio link is failed and report failure to an eNB, when the measured RSRP is below a defined lower threshold, when the UE failed to decode physical downlink control channel (PDCCH) due to poor signal quality (e.g., low RSRP and/or RSRQ), and/or when the UE failed to decode physical downlink shared Channel (PDSCH) due to poor signal quality (e.g., low RSRP and/or RSRQ). Similarly, an eNB may determine that a radio link with a UE has failed when a sunny reference signal power (SINR) from the UE is at least a threshold level lower than what the eNB configured for the UE, and/or when the eNB has not detected a NACK or ACK from the UE for PDSCH.

The one or more improvement action drives can alternatively or additionally be configured to control the reporting time interval at which eMB_i reports event messages to CM_i. The event messages from eNB_i can characterize LTE event messages which are based on RSRP or RSRQ reported by UEs and/or based on measurements by eNB_i, and which can indicate signal strength comparison between itself and neighboring cells. For example, an LTE event can be triggered when the serving cell becomes worse than a defined threshold value, or when a neighbor cell becomes better than the serving cell by a defined offset value. In contrast to existing solutions where reporting intervals are statically defined for eNBs, CMs according to various embodiments of the present disclosure can dynamically control the reporting intervals.

CM_i also receives neighbor information from neighbor CMs and can provide particular local information to the neighbor CMs. In the example context of FIG. 3, CM_i receives from neighbor CM_k, neighbor need information from the radio controller of eNB_k that can include, without limitation, any one or more of information characterizing its coverage area and/or power distribution in the coverage area, QoS requirement(s) (e.g., acceptable range(s)), reference signal received power (RSRP) and/or reference signal received quality (RSRQ) requirement(s) (e.g., acceptable range(s)), etc. CM_i can also receive from neighbor CM_k, eNB_k improvement action drives that are being performed or will be performed by eNB_k to satisfy the set of the neighbor needs of eNB_k.

CM_i can also provide information to neighbor CM_k for its use in managing eNB_k. The output information can include some or all of eNB_k's local needs information that can include, without limitation, any one or more of information characterizing eNB_i's coverage area and/or power distribution in the coverage area, QoS requirement(s) (e.g., acceptable range(s)), reference signal received power (RSRP) and/or reference signal received quality (RSRQ) requirement(s) (e.g., acceptable range(s)), etc. CM_i may also output to CM_k, eNB_i improvement action drives that are being performed or will be performed by eNB_i to satisfy the set of local needs of eNB_i.

CM_i is not limited to receiving the particular information shown in FIG. 3 for use in controlling eNB_i. Instead, CM_i may receive any type of information that can be sensed by eNB_i and/or by neighboring eNBs, and/or that can be reported by one or more UEs to eNB_i and/or by neighboring eNBs to managing CMs and relayed to CM_i. Similarly, CM_i can output to one or more neighboring CMs various information characterizing any knowledge that is obtained by CM_i.

Figure 4:
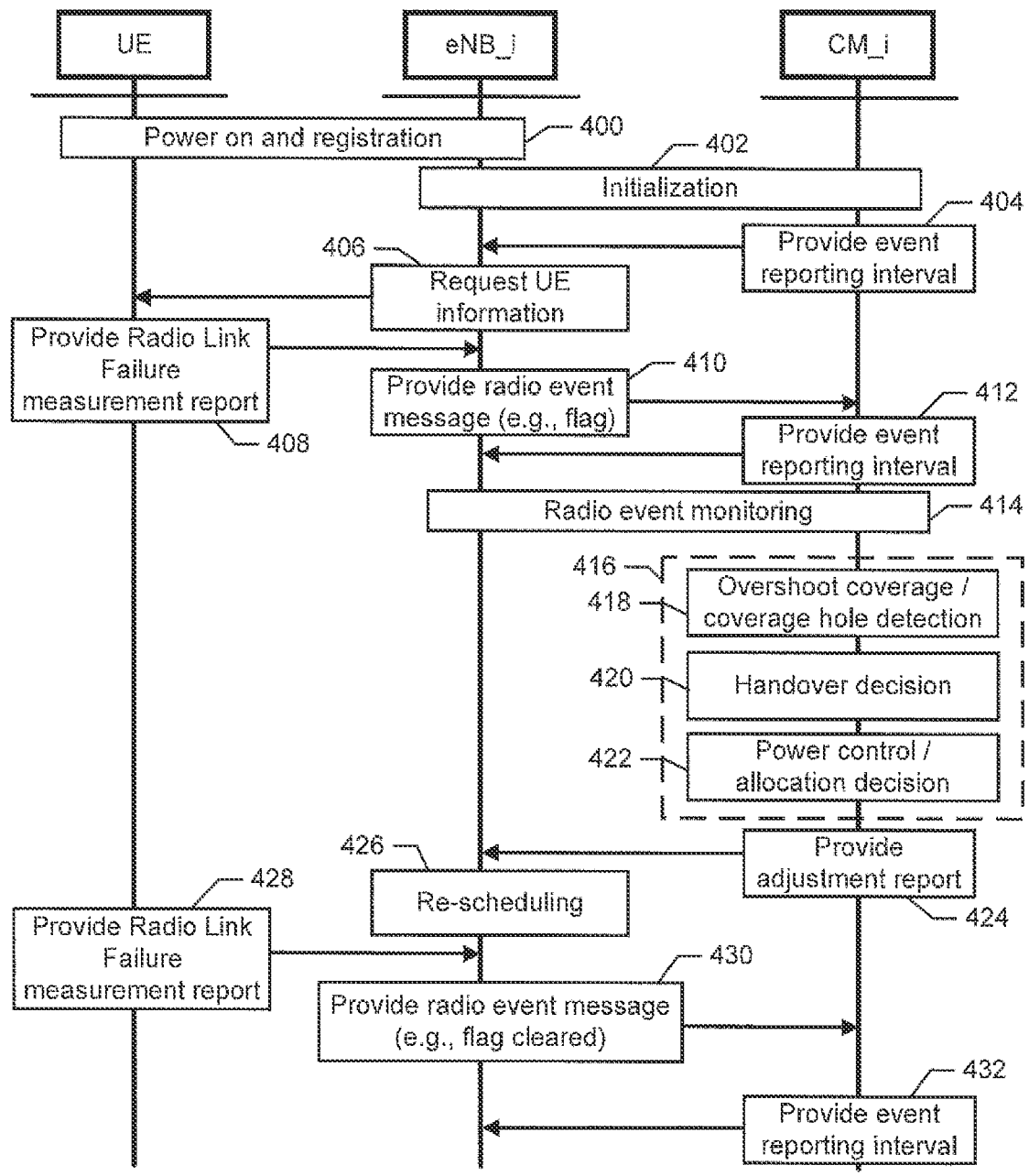
FIG. 4 illustrates a combined flowchart of operations and related data flows between a UE, eNB, and CM in accordance with some embodiments of the present disclosure.

FIG. 4 illustrates a combined flowchart of operations and related data flows between a UE, eNB_i, and CM_i in accordance with some embodiments of the present disclosure.

Referring to FIG. 4, the UE can be any type of wireless terminal including, without limitation, Internet of things (IoT) devices, gaming consoles, smart phones, tablet computers, laptop computers, etc. The eNB_i may instead be a gNB or other more general radio access network (RAN). The UE and eNB_i perform power on and registration operations 400 which may correspond to a conventional process whereby a UE attaches to an eNB_i for service. Responsive to registration 400, the eNB_i and CM_i perform an initialization process which may include the eNB_i initiating local execution of the CM_i or initiating remote instantiation execution of the CM_i on a cloud server resource. The cloud server may alternatively monitor eNB operations and decide when to instantiate and assign a CM to manage one of the eNBs.

The initialization process 402 may include CM_i operating to select which other CMs will be treated as neighbor CMs (e.g., CM_k) with which CM_i will exchange information for use in controlling their respective eNBs. For example, a first CM may select a second CM to be included in the set of neighbor CMs for sharing purposed based on any one or more of the following decisions: the second CM is determined to be within a threshold physical distance of the first CM; the second CM is determined to manage a second eNB that is within a threshold physical distance of a first eNB is managed by the first CM; the second CM has is determined to have needs and/or improvement action drives that satisfy a defined rule based on comparison to the corresponding local needs and/or local improvement action drives of the first CM; and/or based on determining when a defined rule is satisfied by an estimated effect that one or more local improvement action drives by the first CM will have on the radio communication performance of the second eNB that is managed by the second CM. thus, for example, when increasing transmission power of the first eNB is determined to satisfy the defined rule for estimated negative interference to the radio performance of the second eNB, the second CM can be included in the group of neighboring CMs that the first CM exchanges information with to perform cooperative management of their respective eNBs.

CM_i provides 404 an event reporting interval to the eNB_i which controls how often the eNB_i provides radio event messages to CM_i which characterize radio events associated with one or more UEs that are served by eNB_i. eNB_i 406 requests UE information, which may include a request to report radio events, such as radio link failure (RLF) events, that have been detected by UE. For example, UE provides 408 LTE RLF measurement reports to eNB_i which, in turn, are provided 410 to CM_i. CM_i may dynamically change the event reporting interval that is used by eNB_i based on, for example, a number of RLF events reported by UEs during one or more previous time intervals and/or severity of communication degradation or losses indicated by the reported RLFs. In the example of FIG. 4 the CM_i decides to modify the event reporting interval by providing 412 a new event reporting interval to eNB_i. For example, operation 410 may indicate RLF has occurred, e.g., more than a threshold number of RLF events reported by UE, and operation 412 may correspondingly decrease eNB_i's event reporting interval so CM_i receives more frequent radio event messages to enable faster dynamic decision-making on improvement actions drive(s) to be performed by eNB_i.

eNB_i and CM_i continue to monitor 414 the reported radio events, such as the number of RLF reported by UEs during one or more previous time intervals and/or a severity of communication degradation or loss indicated by the reported RLFs. CM_i determines based on the monitoring, based on the local needs, and based on information received from neighboring CM_i, a local improvement action drive 416 that is to be performed by eNB_i to satisfy one or more local needs of eNB_i. Example local improvement action drives 416 can include, without limitation, one or more of the following that is selected by CM_i to control eNB_i: action drives configured to remedy a detected 418 overshoot in eNB_i coverage area such as by decreasing transmission power and/or performing antenna beam steering away from the overshoot, and/or hole in eNB_i coverage area such as by increasing transmission power and/or performing antenna beam steering toward the hole; initiating handover 420 responsive to a handover decision; and controlling 422 eNB_i transmission power and/or frequency allocation.

Other example local improvement action drives that can be determined by CM_i and used to control eNB_i can include any one or more of the following: determining a link adaptation parameter to be used by eNB_i to communicate with a mobile device to satisfy the at least one of the set of local needs from eNB_i; determining a transmission timing interval parameter to be used by eNB_i to communicate with the mobile device to satisfy the at least one of the set of local needs from eNB_i; determining a dynamic power control parameter and/or a power control parameter to be used by eNB_i to communicate with the mobile device to satisfy the at least one of the set of local needs from eNB_i; and determining a handover parameter to be used for controlling handover of the mobile device between eNB_i and one of the neighbor eNBs (e.g., eNB_k) to satisfy the at least one of the set of local needs from eNB_i.

CM_i provides 424 an adjustment report to eNB_i, where the adjustment report identifies the local improvement action drive is to be performed. eNB_i can perform rescheduling 426 and other operations to carry out actions associated with performing the local action improvement drive, such as changing transmission power levels, changing frequency used for communication with UEs, changing modulation used for communications, performing antenna beam steering, and/or changing scheduling of resource allocations for communications with UEs.

The UE continues to provide 428 radio link failure measurement reports at the currently set event reporting interval, which are provided 430 to CM_i. CM_i can continue to make decisions whether a change to the event reporting interval is advantageous and, if so provide 432 the changed event reporting interval to eNB_i. Operation 430 may indicate that the RLF event has cleared (e.g., less than a threshold number of UE RLF reports has been received over the previous interval), and operation 432 CM_i may correspondingly increase eNB_i's event reporting interval so CM_i receives less frequent radio event messages.

Figure 5:
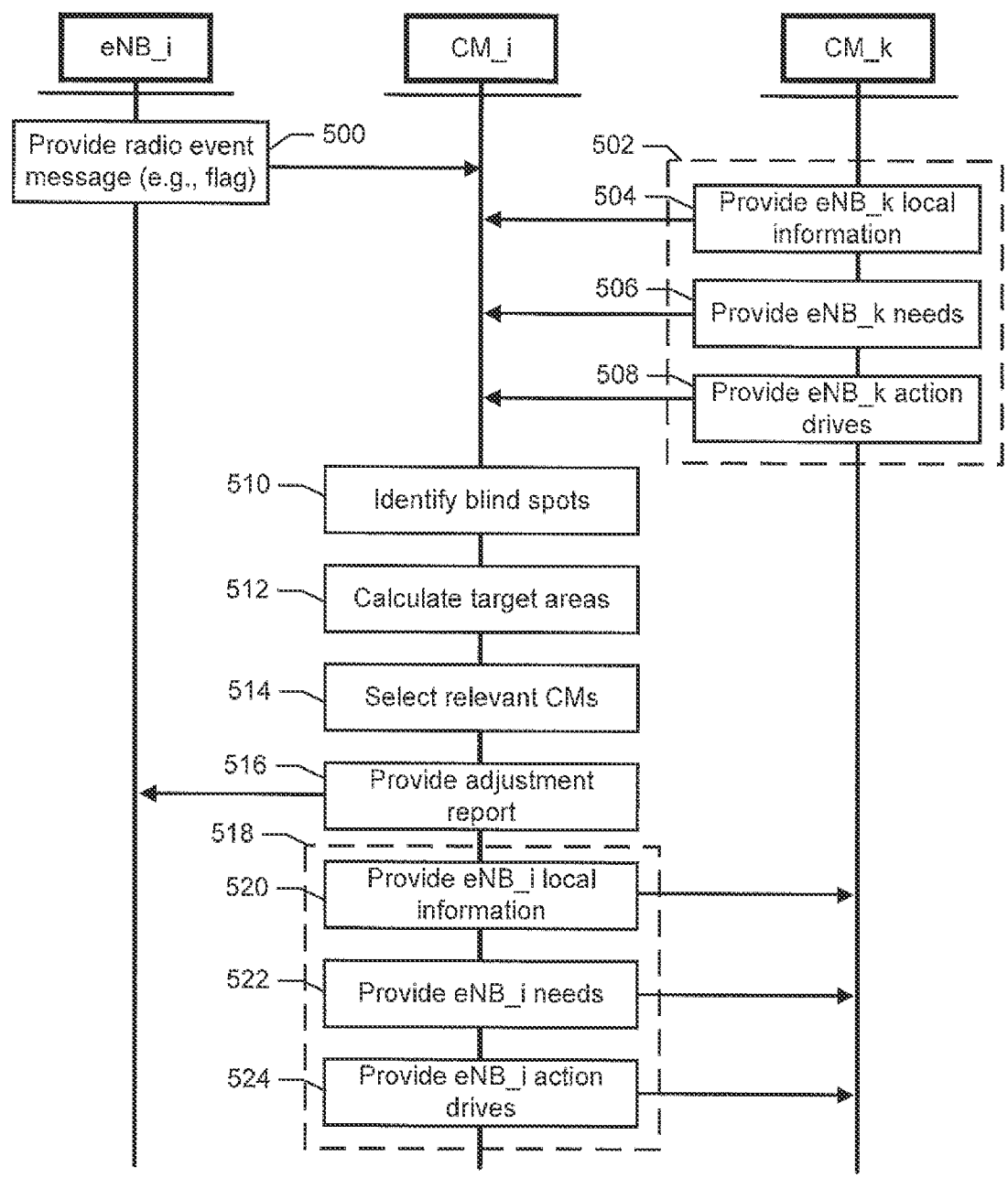
FIG. 5 illustrates a combined flowchart of operations and related data flows between an eNB, a CM managing the eNB, and a neighbor CM in accordance with some embodiments of the present disclosure.

FIG. 5 illustrates a combined flowchart of operations and related data flows between an eNB, CM_i managing the eNB_i, and neighbor CM_k which manages eNB_k in accordance with some embodiments of the present disclosure.

Referring to FIG. 5, eNB_i provides 500 a radio event message to CM_i. CM_i also receives information 502 from CM_k. For example, CM_k provides 504 local information, provides 506 eNB_k's needs, and provides 508 eNB_k improvement action drives CM j combines information received from eNB j and information received 502 from CM_k to identify 510 blind spots, calculate 512 target areas, and/or select 514 relevant CMs that are to be included in the set of neighbor CMs which will receive information from CM_i and provide information to CM_i for use in cooperatively managing their respective eNBs. CM_i provides 516 and adjustment report to eNB_i, where the adjustment report identifies a local improvement action drive is to be performed by eNB_i. CM_i can provide 518 relevant information to CM_k for its use in managing operation of eNB_k. For example, CM_i can provide 520 eNB_i local information to CM_k, provide eNB_i needs to CM_k, and/or provide 522 eNB_i improvement action drives to CM_k.

Figure 6:
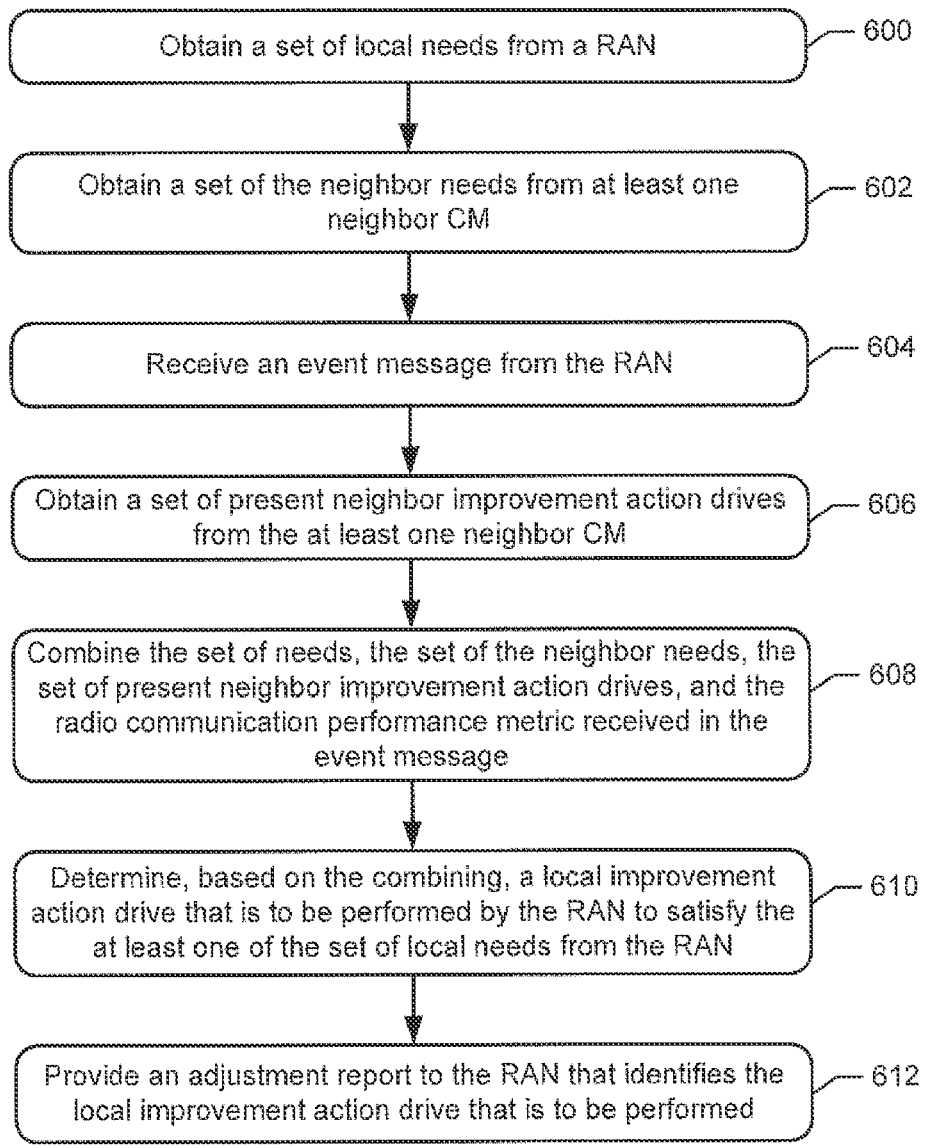
FIGS. 6 and 7 are flowcharts of operations performed by a CM to communicate with neighbor CMs for purposes of managing an eNB or other RAN in accordance with some embodiments of the present disclosure.
Figure 7:
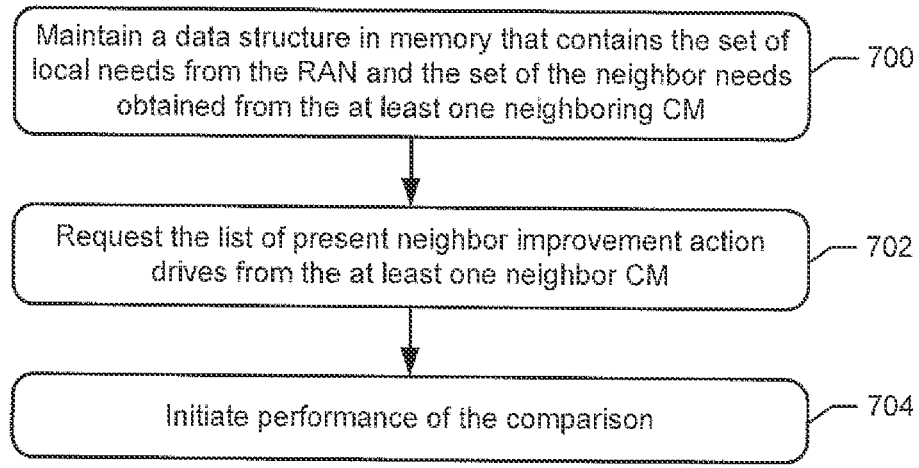

Further general operations and types of information that can be exchanged between RANs (a more general form of eNBs or gNBs) and CMs and exchanged between CMs to provide more optimized cooperative control of a set of RANs are described below in the context of FIGS. 6 and 7. FIGS. 6 and 7 are flowcharts of operations performed by a CM to communicate with neighbor CMs for purposes of managing a RAN in accordance with some embodiments of the present disclosure.

The operations include obtaining 600 a set of local needs from the RAN, where each of the local needs identifies a radio communication performance criterion that is to be satisfied for the RAN. The operations obtain 602 from at least one neighbor CM a set of the neighbor needs for the at least one neighbor RAN. An event message is received 604 from the RAN containing a radio communication performance metric that does not presently satisfy at least one of the set of local needs from the RAN. The operations obtain 606 from the at least one neighbor CM a set of present neighbor improvement action drives that are being performed or will be performed to satisfy the set of the neighbor needs for the at least one neighbor RAN. The operations combine 608 (e.g., also 416 in FIGS. 4 and 510-512 in FIG. 5) the set of local needs from the RAN, the set of the neighbor needs obtained for the at least one neighbor CM, the set of present neighbor improvement action drives from the at least one neighbor CM, and the radio communication performance metric received in the event message from the RAN. The operations then determine 610, based on the combining, a local improvement action drive that is to be performed by the RAN to satisfy the at least one of the set of local needs from the RAN. The operations provide 612 an adjustment report to the RAN, where the adjustment report identifies the local improvement action drive that is to be performed.

The CM may provide some or all of its local information to one or more neighbor CMs. For example, the CM operations can provide (e.g., 522 in FIG. 5) the set of local needs of the RAN to the at least one neighbor CM for use in controlling the at least one neighbor RAN. Based on the determination 610 of the local improvement action drive that is to be performed by the RAN, the CM operation can provide (e.g., 524 in FIG. 5) the local improvement action drive to the at least one neighbor CM for use in controlling the at least one neighbor RAN.

The CM operations may maintain 700 (FIG. 7) a data structure in memory that contains the set of local needs from the RAN and the set of the neighbor needs obtained from the at least one neighboring CM. Responsive to receipt of the event message from the RAN, the CM operations can request 702 (FIG. 7) the list of present neighbor improvement action drives from the at least one neighbor CM, and initiate performance 704 (FIG. 7) of the combining 608 responsive to receipt of the list of present neighbor improvement action drives from the at least one neighbor CM and based on retrieving from the memory the data structure containing the set of local needs of the RAN and the set of the neighbor needs of the at least one neighboring CM.

One of the local needs may identify at least one of an acceptable range of RSRP and an acceptable range of RSRQ that is to be satisfied for the RAN. The radio communication performance metric received in the event message from the RAN may identify at least one of a RSRP value and a RSRQ value that is outside the at least one of the acceptable range of RSRP and the acceptable range of RSRQ that is to be satisfied for the RAN.

The operation to determine 610, based on the combining, of the local improvement action drive that is to be performed by the RAN to satisfy the at least one of the set of local needs from the RAN, may include at least one of: determining a link adaptation parameter to be used by the RAN to communicate with a mobile device to satisfy the at least one of the set of local needs from the RAN; determining a transmission timing interval parameter to be used by the RAN to communicate with the mobile device to satisfy the at least one of the set of local needs from the RAN; determining a dynamic power control parameter and/or a power control parameter to be used by the RAN to communicate with the mobile device to satisfy the at least one of the set of local needs from the RAN; and determining a handover parameter to be used for controlling handover of the mobile device between the RAN and one of the at least one neighbor RAN to satisfy the at least one of the set of local needs from the RAN. The CM operations can then include communicating a message to the at least one neighbor CM identifying the determined at least one of the link adaptation parameter, the transmission timing interval parameter, the dynamic power control parameter and/or the power control parameter and the handover parameter.

The CM operations can include coordinating with the at least one neighbor CM to identify at least one of blind spots in communication service areas that are provided by the RAN and the at least one neighbor RAN and target areas for communication services that are provided by the RAN and the at least one neighbor RAN.

The CM operations to determine 610, based on the combining, of the local improvement action drive that is to be performed by the RAN to satisfy the at least one of the set of local needs from the RAN, can include: estimating an effect that the local improvement action drive will have on the present neighbor improvement action drives that are being performed or will be performed by the at least one neighbor RAN to satisfy the set of the neighbor needs; and determining the local improvement action drive that is to be performed by the RAN to satisfy the at least one of the set of local needs from the RAN, responsive to the estimation of the effect.

Alternatively or additionally, the CM operations to determine 610, based on the combining, of the local improvement action drive that is to be performed by the RAN to satisfy the at least one of the set of local needs from the RAN, can include estimating an effect that the local improvement action drive will have on radio communication performance of the at least one neighbor RAN being able to satisfy the neighbor needs of the at least one neighbor RAN; and determining the local improvement action drive that is to be performed by the RAN to satisfy the at least one of the set of local needs from the RAN, responsive to the estimation of the effect.

The CM operations may further include determining based on the combining a reporting interval at which the RAN is to provide event messages to the CM, and providing the reporting interval to the RAN. The CM operations may communicate a message identifying the reporting interval to the at least one neighbor CM.

As explained above, the CM operations can be performed by at least one processor that is part of the RAN. Alternatively or additionally, a cloud server that is networked to the RANs can performing a plurality of CMs, where the plurality of CMs operate to control the plurality of RANs with a one-to-one control relationship between the CMs and the RANs, and wherein the CM is one of the plurality of CMs.

The CM operations can further include selecting (e.g., 514 in FIG. 5) a relevant subset of CMs which control a subset of neighboring RANs from among a set of CMs which control the plurality of RANs, based on the set of local needs from the RAN, sets of the neighbor needs obtained from the set of CMs, and sets of present neighbor improvement action drives from the set of CMs. The CM operations can then include performing the combining (e.g., 416 in FIG. 4, 510-512 in FIG. 5, 608 in FIG. 6) to combine the set of local needs from the RAN, the sets of the neighbor needs obtained for the relevant subset of CMs, the sets of present neighbor improvement action drives from the relevant subset of CMs, and the radio communication performance metric received in the event message from the RAN.

Example RAN with CM

Figure 8:
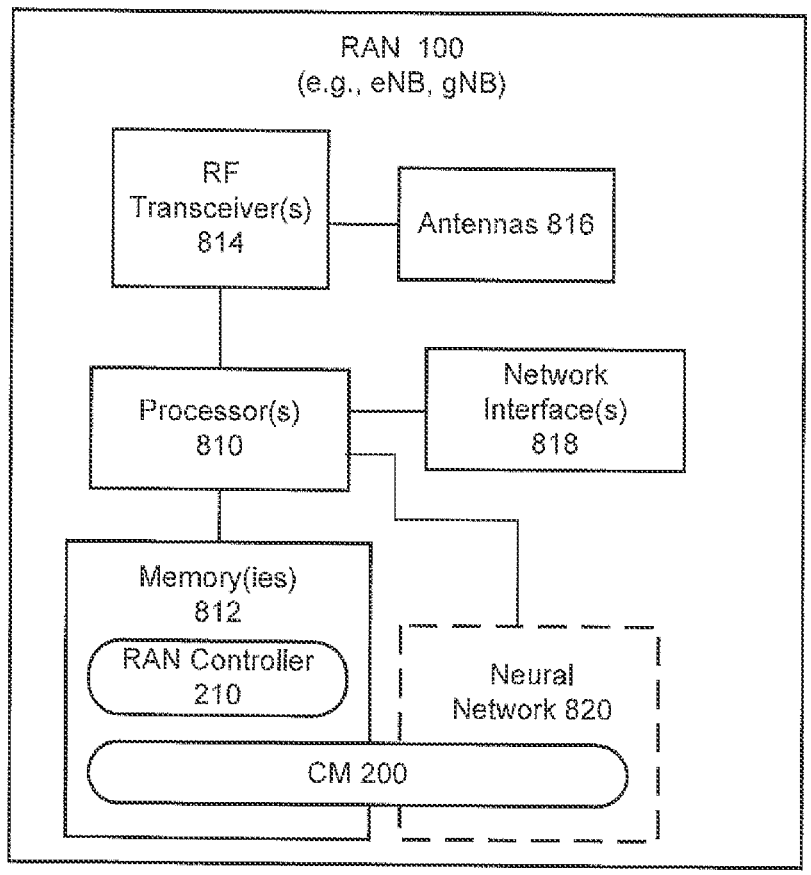
FIG. 8 is a block diagram of hardware circuit components of a RAN including a CM and which are configured to operate in accordance with some embodiments.
Figure 9:
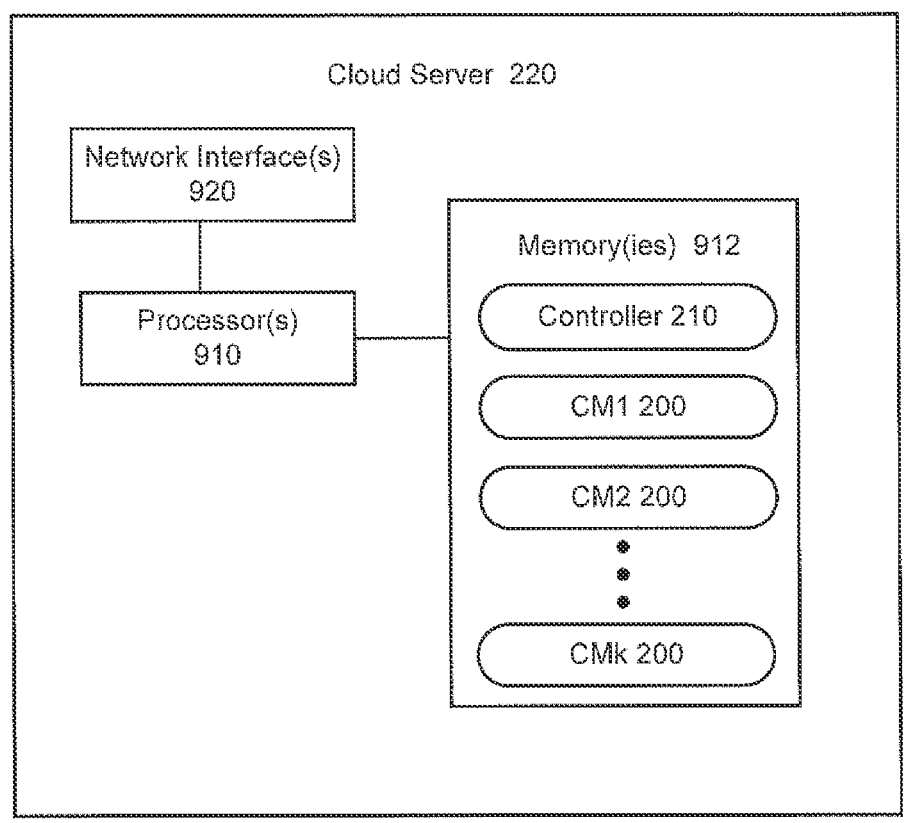
FIG. 9 is a block diagram of hardware circuit components of a cloud server including CMs and which are configured to operate in accordance with some embodiments of the present disclosure.

FIG. 8 is a block diagram of hardware circuit components of a RAN 100 that includes a CM and where the components are configured to operate in accordance with some embodiments. The RAN 100 can include a wired/wireless network interface circuit 818, a RF transceiver 814 connected to local and/or remote antennas 816, at least one processor circuit 810 (processor), and at least one memory circuit 812 (memory). The processor 810 is connected to communicate with the other components. The memory 812 stores a RAN controller 210 that is executed by the processor 810 to perform operations disclosed herein, such as RAN communication protocol operations, traffic encoding and decoding operations, power control and frequency resource assignment operations, etc. The memory 812 can also include CM 200 software that performs at least some of the operations disclosed herein. In some embodiments, the CM 200 can be embodied in a neural network 820 which may be performed by clocked digital components, such as the processor 810, discrete logic components, such as a digital logic gate array, and/or may be performed by analog circuitry that is configured for neural network processing. The processor 810 may include one or more data processing circuits (e.g., microprocessor and/or digital signal processor), which may be collocated or distributed across one or more data networks. The processor 810 is configured to execute the program code in the memory 812, described below as a non-transitory computer readable medium, to perform some or all of the operations and methods for one or more of the embodiments disclosed herein for a RAN and CM Example Cloud Server with CM Some or all operations described above as being performed by the RAN 100 and/or the CM 200 may alternatively be performed by a node that is part of a cloud computing resource. FIG. 9 is a block diagram of hardware circuit components of a cloud server 220 including CMs and which are configured to operate in accordance with some embodiments of the present disclosure. The cloud server 220 can include a wired/wireless network interface circuit 920, at least one processor circuit 910 (processor), and at least one memory circuit 912 (memory). The processor 910 is connected to communicate with the other components. The memory 912 stores controller software 210 which instantiates CMs 200, e.g., CM1 . . . CMk, which respectively manage different RANs that are networked to the cloud server 220, e.g., RAN1 . . . RANk, to perform operations disclosed herein for CMs. The processor 910 may include one or more data processing circuits (e.g., microprocessor and/or digital signal processor), which may be collocated or distributed across one or more data networks. The processor 910 is configured to execute computer program instructions in the memory 912, described below as a non-transitory computer readable medium, to perform some or all of the operations and methods for one or more of the embodiments disclosed herein for a mobile electronic device.

Abbreviations:
eNB Evolved Node B
CN Cognitive Network
CR Cognitive Radio
CA Cognitive Agents
RAN Radio Access Network
CCO Coverage and Capacity Optimization
BTS Base Stations
UE User Equipment
PHY Physical Layer
SINR Signal to Noise and Interference Ratio
QoS Quality of Service
RAT Radio Access Technology
RLF Radio Link Failure
TTI Transmission Time Interval
LTE Long Term Evolution
RBS Radio Base Station
CM Cognitive Manager Further Definition and Embodiments:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a Cognitive Manager, CM, for controlling a radio access network, RAN, among a plurality of RANs of a radio communications system, the method comprising:
   obtaining a set of local needs from the RAN, wherein each of the local needs identifies a radio communication performance criterion that is to be satisfied for the RAN;
   obtaining from at least one neighbor CM configured to control at least one neighbor RAN a set of the neighbor needs for the at least one neighbor RAN;
   receiving an event message from the RAN containing a radio communication performance metric that does not presently satisfy at least one of the set of local needs from the RAN;
   obtaining from the at least one neighbor CM a set of present neighbor improvement action drives that are being performed or will be performed to satisfy the set of the neighbor needs for the at least one neighbor RAN;
   combining the set of local needs from the RAN, the set of the neighbor needs obtained for the at least one neighbor CM, the set of present neighbor improvement action drives from the at least one neighbor CM, and the radio communication performance metric received in the event message from the RAN, wherein the combining includes using information received from the at least one neighbor CM to identify blind spots in communication service areas that are provided by the RAN and the at least one neighbor RAN and/or to identify target areas for communication services that are provided by the RAN and the at least one neighbor RAN;
   determining, based on the combining, a local improvement action drive that is to be performed by the RAN to satisfy the at least one of the set of local needs from the RAN; and
   providing an adjustment report to the RAN, the adjustment report identifying the local improvement action drive that is to be performed.

2. The method of claim 1, further comprising:
   providing the set of local needs of the RAN to the at least one neighbor CM for use in controlling the at least one neighbor RAN; and
   based on the determination of the local improvement action drive that is to be performed by the RAN, providing the local improvement action drive to the at least one neighbor CM for use in controlling the at least one neighbor RAN.

3. The method of claim 1, further comprising:
   maintaining a data structure in memory that contains the set of local needs from the RAN and the set of the neighbor needs obtained from the at least one neighboring CM; and
   responsive to receipt of the event message from the RAN, requesting the set of present neighbor improvement action drives from the at least one neighbor CM, initiate performance of the combining responsive to receipt of the set of present neighbor improvement action drives from the at least one neighbor CM and based on retrieving from the memory the data structure containing the set of local needs of the RAN and the set of the neighbor needs of the at least one neighboring CM.

4. The method of claim 1, wherein:
   one of the local needs identifies at least one of an acceptable range of Reference Signal Received Power, RSRP, and an acceptable range of Reference Signal Received Quality, RSRQ, that is to be satisfied for the RAN; and
   the radio communication performance metric receiving in the event message from the RAN identifies at least one of a RSRP value and a RSRQ value that is outside the at least one of the acceptable range of RSRP and the acceptable range of RSRQ that is to be satisfied for the RAN.

5. The method of claim 1, wherein the determination, based on the combining, of the local improvement action drive that is to be performed by the RAN to satisfy the at least one of the set of local needs from the RAN, comprises at least one of:
   determining a link adaptation parameter to be used by the RAN to communicate with a mobile device to satisfy the at least one of the set of local needs from the RAN;
   determining a transmission timing interval parameter to be used by the RAN to communicate with the mobile device to satisfy the at least one of the set of local needs from the RAN;
   determining a dynamic power control parameter and/or a power control parameter to be used by the RAN to communicate with the mobile device to satisfy the at least one of the set of local needs from the RAN; and
   determining a handover parameter to be used for controlling handover of the mobile device between the RAN and one of the at least one neighbor RAN to satisfy the at least one of the set of local needs from the RAN.

6. The method of claim 5, further comprising:
   communicating a message to the at least one neighbor CM identifying the determined at least one of the link adaptation parameter, the transmission timing interval parameter, the dynamic power control parameter and/or the power control parameter and the handover parameter.

7. The method of claim 1, wherein the determination, based on the combining, of the local improvement action drive that is to be performed by the RAN to satisfy the at least one of the set of local needs from the RAN, comprises:
   estimating an effect that the local improvement action drive will have on the present neighbor improvement action drives that are being performed or will be performed by the at least one neighbor RAN to satisfy the set of the neighbor needs; and
   determining the local improvement action drive that is to be performed by the RAN to satisfy the at least one of the set of local needs from the RAN, responsive to the estimation of the effect.

8. The method of claim 1, wherein the determining, based on the combining, of the local improvement action drive that is to be performed by the RAN to satisfy the at least one of the set of local needs from the RAN, comprises:
  estimating an effect that the local improvement action drive will have on radio communication performance of the at least one neighbor RAN being able to satisfy the neighbor needs of the at least one neighbor RAN; and
  determining the local improvement action drive that is to be performed by the RAN to satisfy the at least one of the set of local needs from the RAN, responsive to the estimation of the effect.

9. The method of claim 1, further comprising:
  determining based on the combining a reporting interval at which the RAN is to provide event messages to the CM; and
  providing the reporting interval to the RAN.

10. The method of claim 1, further comprising:
  performing a plurality of CMs by a cloud server that is networked to the RAN, wherein the plurality of CMs operate to control the plurality of RANs with a one-to-one control relationship between the CMs and the RANs, and wherein the CM is one of the plurality of CMs.

11. The method of claim 1, further comprising:
  selecting a relevant subset of CMs which control a subset of neighboring RANs from among a set of CMs which control the plurality of RANs, based on the set of local needs from the RAN, sets of the neighbor needs obtained from the set of CMs, and sets of present neighbor improvement action drives from the set of CMs; and
  performing the combining to combine the set of local needs from the RAN, the sets of the neighbor needs obtained for the relevant subset of CMs, the sets of present neighbor improvement action drives from the relevant subset of CMs, and the radio communication performance metric received in the event message from the RAN.

12. A network node for controlling a radio access network, RAN, among a plurality of RANs of a radio communications system, the network node comprising: a Cognitive Manager, CM, that controls the RAN by operations comprising:
  obtaining a set of local needs from the RAN, wherein each of the local needs identifies a radio communication performance criterion that is to be satisfied for the RAN;
  obtaining from at least one neighbor CM configured to control at least one neighbor RAN a set of the neighbor needs for the at least one neighbor RAN;
  receiving an event message from the RAN containing a radio communication performance metric that does not presently satisfy at least one of the set of local needs from the RAN;
  obtaining from the at least one neighbor CM a set of present neighbor improvement action drives that are being performed or will be performed to satisfy the set of the neighbor needs for the at least one neighbor RAN;
  combining the set of local needs from the RAN, the set of the neighbor needs obtained for the at least one neighbor CM, the set of present neighbor improvement action drives from the at least one neighbor CM, and the radio communication performance metric received in the event message from the RAN, wherein the combining includes using information received from the at least one neighbor CM to identify blind spots in communication service areas that are provided by the RAN and the at least one neighbor RAN and/or to identify target areas for communication services that are provided by the RAN and the at least one neighbor RAN;
  determining, based on the combining, a local improvement action drive that is to be performed by the RAN to satisfy the at least one of the set of local needs from the RAN; and
  providing an adjustment report to the RAN, the adjustment report identifying the local improvement action drive that is to be performed.

13. The network node of claim 12, further comprising:
  a neural network configured to perform at least part of the combining of the set of local needs from the RAN, the set of the neighbor needs obtained for the at least one neighbor CM, the set of present neighbor improvement action drives from the at least one neighbor CM, and the radio communication performance metric received in the event message from the RAN to generate at least one output value,
  wherein the determination of the local improvement action drive is performed based on the at least one output value from the neural network.

14. The network node of claim 12, wherein the operations further comprise:
  providing the set of local needs of the RAN to the at least one neighbor CM for use in controlling the at least one neighbor RAN; and
  based on the determination of the local improvement action drive that is to be performed by the RAN, providing the local improvement action drive to the at least one neighbor CM for use in controlling the at least one neighbor RAN.

15. The network node of claim 12, wherein the operations further comprise:
  maintaining a data structure in memory that contains the set of local needs from the RAN and the set of the neighbor needs obtained from the at least one neighboring CM; and
  responsive to receipt of the event message from the RAN, requesting the set of present neighbor improvement action drives from the at least one neighbor CM,
    initiate performance of the combining responsive to receipt of the set of present neighbor improvement action drives from the at least one neighbor CM and based on retrieving from the memory the data structure containing the set of local needs of the RAN and the set of the neighbor needs of the at least one neighboring CM.

16. The network node of claim 12, wherein:
  one of the local needs identifies at least one of an acceptable range of Reference Signal Received Power, RSRP, and an acceptable range of Reference Signal Received Quality, RSRQ, that is to be satisfied for the RAN; and
  the radio communication performance metric received in the event message from the RAN identifies at least one of a RSRP value and a RSRQ value that is outside the at least one of the acceptable range of RSRP and the acceptable range of RSRQ that is to be satisfied for the RAN.

17. The network node of claim 12, wherein the determination, based on the combining, of the local improvement action drive that is to be performed by the RAN to satisfy the at least one of the set of local needs from the RAN, comprises at least one of:
- determining a link adaptation parameter to be used by the RAN to communicate with a mobile device to satisfy the at least one of the set of local needs from the RAN;
- determining a transmission timing interval parameter to be used by the RAN to communicate with the mobile device to satisfy the at least one of the set of local needs from the RAN;
- determining a dynamic power control parameter and/or a power control parameter to be used by the RAN to communicate with the mobile device to satisfy the at least one of the set of local needs from the RAN; and
- determining a handover parameter to be used for controlling handover of the mobile device between the RAN and one of the at least one neighbor RAN to satisfy the at least one of the set of local needs from the RAN.

18. A Cognitive Manager, CM, computer program product for controlling a radio access network, RAN, among a plurality of RANs of a radio communications system, the CM computer program product comprising:
- a non-transitory computer readable medium storing program code that is executable by at least processor of a network node to perform operations comprising:
  - obtaining a set of local needs from the RAN, wherein each of the local needs identifies a radio communication performance criterion that is to be satisfied for the RAN;
  - obtaining from at least one neighbor CM configured to control at least one neighbor RAN a set of the neighbor needs for the at least one neighbor RAN;
  - receiving an event message from the RAN containing a radio communication performance metric that does not presently satisfy at least one of the set of local needs from the RAN;
  - obtaining from the at least one neighbor CM a set of present neighbor improvement action drives that are being performed or will be performed to satisfy the set of the neighbor needs for the at least one neighbor RAN;
  - combining the set of local needs from the RAN, the set of the neighbor needs obtained for the at least one neighbor CM, the set of present neighbor improvement action drives from the at least one neighbor CM, and the radio communication performance metric received in the event message from the RAN, wherein the combining includes using information received from the at least one neighbor CM to identify blind spots in communication service areas that are provided by the RAN and the at least one neighbor RAN and/or to identify target areas for communication services that are provided by the RAN and the at least one neighbor RAN;
  - determining, based on the combining, a local improvement action drive that is to be performed by the RAN to satisfy the at least one of the set of local needs from the RAN; and
  - providing an adjustment report to the RAN, the adjustment report identifying the local improvement action drive that is to be performed.

* * * * *